Patented Feb. 20, 1945

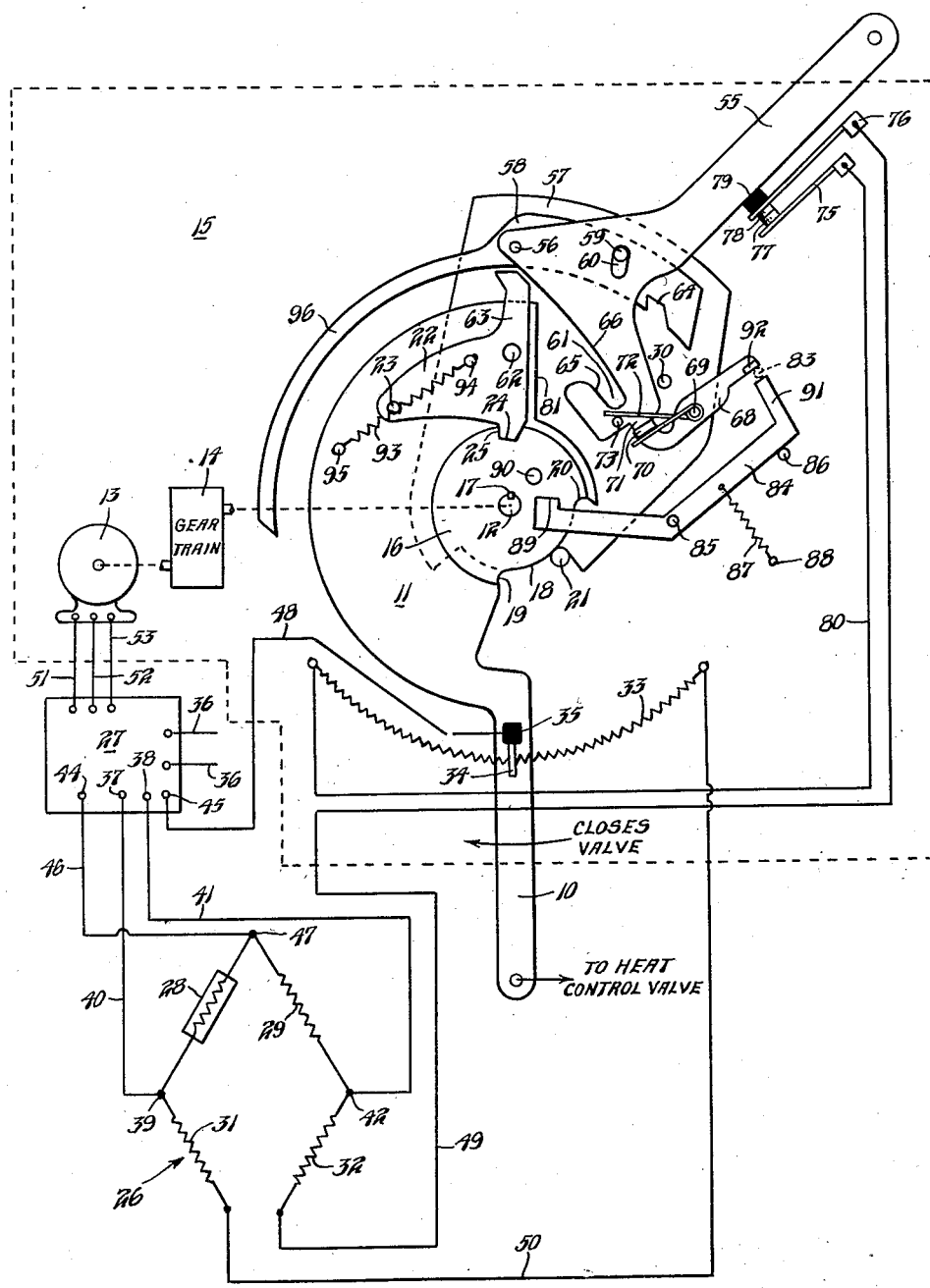

2,370,025

UNITED STATES PATENT OFFICE 2,370,025

MANUAL CONTROL APPARATUS

Walter E. Edelman, Minneapolis, Minn., assignor to Minneapolis-Honeywell Regulator Company, Minneapolis, Minn., a corporation of Delaware Application October 14, 1942, Serial No. 461,989

11 Claims. (Cl. 74—407)

The present invention relates to positioning systems in which a member to be positioned is normally operated by a power means, manual operating means being provided for manually and mechanically positioning the member entirely independently of the power means and is an improvement upon the co-pending application of Russell H. Whempner, Serial No. 461,954, filed in the United States Patent Office October 14, 1942.

One of the objects of the present invention is the provision of manual operating means for an element normally positioned by a power means wherein the arrangement is such that control over the element cannot be lost regardless of the direction of any force which is applied to the element.

More specifically it is an object of my invention to provide an arrangement in which the element to be positioned is selectively connected either to a manual operator or a power operator and cannot, under any circumstances, be disconnected from both of the operators at the same time.

Another object of the invention is the provision of manual operating means for an element that is normally positioned by a power means wherein the arrangement is such that after operation of the element is once taken over by the manual means, the manual means remains in control of the element until the power means is in a predetermined position.

Another object of the invention is the provision of an arrangement for selectively coupling a manual operator or a power operator to a member to be positioned, it being impossible for both the manual means and the power operator to be uncoupled from the member to be positioned at the same time.

Other objects of the present invention include the provision of a manual operator for a member that is normally positioned by a power operator in which the parts are so arranged and cooperate with each other in such manner that at all times, except during the clutching and declutching operations, the clutching or latching mechanism is positively maintained in one or the other of the two positions which it is possible for it to assume.

Other objects of the invention will become clear upon a reading of the specification and claims and will be found in the single drawing which discloses a preferred form of my invention with the parts somewhat spread out in order to show their cooperation more clearly.

Turning to the single figure of the drawing, the present invention is shown as applied to a system of temperature control which may conveniently be utilized to control the temperature of the interior of an aircraft cabin. A member to be positioned is shown in the form of an arm 10 which may be connected in any of the usual manners to a heat control valve or the like. Arm 10 forms an extension of a plate 11 having a somewhat semi-circular shape which is journalled upon or concentrically with a shaft 12 for rotation independently thereof. The shaft 12 comprises the final driven shaft of a power operator herein shown as comprising an electrical motor 13 of the split phase type which is connected to the final driven shaft 12 by means of the usual reducing gear train 14. While the parts have here been shown diagrammatically for the sake of clarity, it will be understood that in actual construction the motor 13, gear train 14 and final driven shaft 12 are conveniently a unitary structure with which there is associated a base plate or mounting plate 15 shown in dotted lines. The final driven shaft 12 is journalled in the base plate 15 and of course is further provided with sufficient other bearings which have here been omitted so that the essential parts of the apparatus may be shown more clearly.

The final driven shaft 12 is normally coupled to the plate 11 so that the driven arm 10 is normally mechanically connected to the motor 13. To this end, a substantially circular plate or disk 16 which lies in front of the plate 11 is secured to the final driven shaft 12 by any suitable means such as the key 17. The disk 16 is provided with a portion 18 of reduced radius which joins the larger radius of the main part of the disk 16 so as to form stop portions 19 and 20. These stop portions cooperate with a stop pin 21 carried by base plate 15 whereby the disk 16 is permitted to move only throughout a predetermined arc.

A latch plate 22 is pivoted to the driven plate 11 by a pin 23. This latch plate 22 lies in front of driven plate 11 in the same plane as disk 16 and is provided with a driving latch 24 which is normally engaged in a notch 25 provided in the disk 16. In this manner, the disk 16 is normally mechanically connected to the driven plate 11 so that there is a two-way driving connection between these parts. As a result, the motor 13 is normally rigidly connected to the driven arm 10.

With the parts thus far described, and when they are in the position and relationship shown, it will be clear that the arm 10 is positioned exactly in accordance with the movement of the motor 13, which range of movement is limited by the stop pin 21 and the cooperating stop portions 19 and 20 of the disk 16.

The motor 13 may of course be controlled in any desired manner and is herein shown as being controlled by a temperature sensitive resistance bridge 26 through an electronic amplifier 27. The resistance bridge 26 consists of four resistance arms interconnected in the usual manner. Included in one of these arms is a temperature sensitive resistance 28 of the usual and known type whose resistance increases upon temperature rise. Another arm of the resistance bridge includes fixed resistance 29. The third and fourth arms of the resistance bridge 26 respectively include fixed resistances 31 and 32 as well as variable portions of a follow-up resistance 33. This follow-up resistance 33 is of the usual type and is conveniently secured to the base plate 15. A cooperating contact arm 34 is carried by a piece of insulating material 35 which is in turn connected to the driven arm 10. The resistance 33 and cooperating contact arm 34 comprise the usual follow-up resistance or balancing resistance for maintaining the bridge circuit 26 in balance.

The resistance bridge 26, electronic amplifier 27 and motor 13 preferably are of the type and are interconnected in the manner fully disclosed in the co-pending application of Albert P. Upton, Serial No. 437,561, filed April 3, 1942. The electronic amplifier 27 is provided with a suitable source of alternating current indicated by the wires 36. It is further provided with bridge power supply terminals 37 and 38. Terminal 37 of the amplifier 27 is connected, through a wire 40, to an input terminal 39 of the bridge circuit which interconnects those arms including the temperature sensitive resistance 28 and the fixed resistance 31. Similarly, the terminal 38 of the amplifier 27 is connected, through a wire 41, with a bridge input terminal 42 which forms the junction of those arms of the bridge which include the fixed resistances 29 and 32. The amplifier 27 is further provided with amplifier input terminals 44 and 45. Terminal 44 is connected, through a wire 46, to bridge output terminal 47 which forms the junction of that arm containing the temperature sensitive resistance 28 and the arm containing the fixed resistance 29. The other terminal 45 is connected to the contact arm 34 by a wire 48. The right-hand end of the balancing resistance 33 is connected to the lower end of the arm containing the fixed resistance 31 by a wire 50. The left-hand end of the balancing resistance 33 is connected to the lower end of the fixed resistance 32, by wire 49, a normally closed switch and a wire 80. The purpose of the normally closed switch will be described hereinafter. The amplifier 27 is further connected to the split phase motor 13 by means of wires 51, 52 and 53.

As fully disclosed in the above referred to Upton application, the split phase motor 13 is provided with two windings one of which is constantly energized by the amplifier. The second winding of the split phase motor 13 is deenergized when the bridge 26 is in balance. When the bridge 26, however, is unbalanced in one direction, the second winding of the split phase motor 13 is energized with a current having a phase which leads that of the constantly energized winding. This causes rotation of the motor 13 in one direction. On the other hand, when the bridge 26 is unbalanced in the other direction, the second winding of the split phase motor 13 is provided with a current having a phase which lags that of the constantly energized winding of the motor with the result that the motor rotates in the opposite direction. Of course, when the bridge is in balance so that the second winding of the motor 13 is deenergized, the motor remains stationary.

With the parts in the position shown, the temperature of the aircraft cabin to which the temperature sensitive resistance 28 responds is at an intermediate value. The bridge is in balance and the motor 13 is inoperative. Under such conditions, the arm 10 is intermediate its extreme positions and the follow-up contact arm 34 is engaging the center of the follow-up or balancing resistance 33. The heat control valve or other apparatus controlled by the driven arm 10 is therefore positioned in such manner as to operate at fifty per cent of its full capacity.

If the temperature within the aircraft cabin should now rise, this will cause an increase in the resistance of temperature sensitive resistance 28. As a result, the bridge 26 will be unbalanced in a predetermined direction. As stated above, this will result in the amplifier 27 supplying current to the second winding of the split phase motor 13 having a phase different than that of the constantly energized winding thereof with the result that motor 13 will begin rotating. This rotation will be in such direction as to move the final driven arm 10 in a clockwise direction to reduce the heating effect of the heat control valve or other heat producing apparatus. Also, such clockwise rotation of the driven arm 10 will move contact arm 34 along balancing resistance 33 towards the left-hand end thereof. This inserts more of the balancing resistance 33 in series with fixed resistance 31 tending to rebalance the bridge. When the driven arm 10 has thus moved far enough in a clockwise direction, the bridge circuit 26 will be rebalanced whereupon the second winding of the split phase motor 13 will be deenergized and further movement of the driven arm 10 will cease. If there should be further temperature increase in the cabin of the aircraft, the arm 10 will be moved in a similar manner to a further extent in a clockwise direction and this may continue until the stop portion 20 of the disk 16 engages the stop pin 21. When such position is reached, the heat producing apparatus will be completely closed down.

If on the other hand, the temperature of the aircraft cabin should fall, the resistance of temperature sensitive resistance 28 will decrease. This will unbalance bridge circuit 26 in the opposite direction with the result that amplifier 27 will now energize the second winding of the split motor 13 with a current having an opposite phase. As a result, the motor 13 rotates in the opposite direction and the final driven arm 10 is moved counter-clockwise. When the final driven arm 10 has reached a position corresponding to the new temperature value in the aircraft cabin, the balancing contact arm 34 will have reached such a position on the balancing resistance 33 as to rebalance the bridge circuit 26. Thereupon, the electronic amplifier 27 deenergizes the second winding of the motor 13 and further operation thereof ceases.

In this manner, the final driven arm 10 and the heat control apparatus is positioned in any portion of its full range of movement in accordance with the temperature fluctuations in the aircraft cabin to which the temperature sensitive resistance responds.

Under some circumstances and particularly with certain applications of the apparatus herein disclosed, it may be not only desirable but in fact necessary to be able to position the driven arm 10 manually entirely independently of the power operating mechanism including the motor 13. To this end, a manual operating arm 55 is provided. The arm 55 is pivoted on a pin 56 that is carried by the plate 57. Plate 57 is in turn pivoted on or journalled concentric with the final driven shaft 12. Interposed between the arm 55 and the plate 57 is a member 58 which is secured to the plate 57. The member 58 is of such thickness, or is provided with bushings or the like so that plate 57 lies in back of plate 11 whereas manual operating arm 55 lies in front of latch plate 22. A pin 59 which helps to secure the plate 57 and member 58 together extends forwardly into an oblong opening 60 formed in the arm 55 whereby the amount of pivotal movement of the arm 55 about the pivot 56 is limited. Or, looking at it in another manner, the plate 57, member 58, and manual operator 55 are all integrally connected except that the manual operator 55 has a slight amount of movement relative to the plate 57. The manual operator 55 is normally biased, by means to be described hereinafter, so that the upper part of slot 60 engages the pin 59. The complete assembly, as pointed out above, is pivoted on or journalled concentrically with the final driven shaft 12. The arm 55 is further provided with a latch operating portion defined by a slot 61 formed therein which is adapted to cooperate with a pin 62 carried by the latch plate 22. The latch plate 22, in addition to the driving latch portion 24, is further provided with a manual latch portion 63 which is adapted, under proper conditions, to enter a notch 64 provided in the member 58.

Let us assume that with the parts in the position shown, it is desired to take over manual control of the driven arm 10. The manual operator 55 is thereupon moved to the left, or counter-clockwise. Since the complete assembly comprising plate 57, member 58 and operator 55 are freely pivoted, and since operator 55 is biased to the position shown in respect to plate 57, the complete assembly pivots in a counter-clockwise direction. Such movement will bring slot 61 in registry with the pin 62 carried by latching plate 22. When pin 62 lies at substantially the right-hand end of slot 61, manual latching portion 63 will be in registry with notch 64. A short pin 30 carried by plate 57 engages the edge 81 of plate 11 when the notch 64 is in registry with the manual latching portion 63. This pin does not extend beyond plate 11 and therefore is not in the path of movement of operator 55. Now, further counter-clockwise rotation of the assembly will be resisted since the pin 30 is engaging plate 11 that carries latch plate 22 which in turn is at present coupled to the driving disk 16. Therefore, further pressure on manual operator 55 overcomes the bias on it and it pivots about pin 56 to the extent permitted by slot 60 and pin 59. Such movement of manual operator 55 in relation to plate 57 causes the portion 65 to lift pin 62 and therefore latch plate 22. The driving latch portion 24 will therefore move out of notch 25 and simultaneously, the manual latch portion 63 will enter notch 64. This uncouples the power operator from driven member 10 and couples the manual operator 55 thereto. The proportions of the parts are such that both the driving latch portion 24 and the manual latch portion 63 are unable to be simultaneously disengaged from their respective cooperating notches 25 and 64. In other words, the latch plate 22 is selectively operable to either latch the power operator or the manual operator to the plate 11 but the plate 11 can never be uncoupled from both of these operators at the same time.

With the latching action just described having been completed, if the manual operator 55 were then moved back in a clockwise direction it would be possible for the surface 66 in cooperation with the pin 62 to immediately move the latch plate 22 back to the position in which it is shown. In order to prevent this, a locking means is provided for maintaining the manual operator 55 latched to the plate 11 after this latching action has once been accomplished. This locking means comprises a locking arm 68 pivoted on a pin 69 that is in turn carried by the plate 57. The lower or left-hand portion of the locking arm 68 is provided with an upstanding portion 70 that is biased to move under the surface 71 provided on the arm 55. This bias is accomplished by a spring 72 which has one end bearing against a pin 73 carried by arm 55, is then wrapped around the pivot pin 69 and has its other end bearing against the upstanding portion 70. This spring constantly biases the locking arm 68 towards its locking position. It is likewise this same spring which biases manual operator 55 so that the upper end of slot 60 normally engages pin 59. As a result, when the manual operating arm 55 has pivoted about the pin 59 against this bias and to the extent permitted by the opening 60, the upstanding portion 70 is moved under the surface 71 so as to lock arm 55 in this new position. The parts 55, 58 and 57 are thus locked together with the manual operator latched to plate 11 so that upon subsequent reverse movement of arm 55 after latching has once occurred no unlatching operation will be possible.

With the parts thus latched and locked together in the manner described, it will be evident that the plate 11 and therefore the driven arm 10 may now be positioned manually in exact accordance with the movements of the manual operator 55. Furthermore, since there is only one notch 64 in member 58 and since there is only one latch portion 63 on latch plate 22 that can enter notch 64, it is obvious that the manual operator 55 and driven arm 10 can only be connected together in a single predetermined relationship. It follows that when they are so connected together, the position of manual operator 55 acts to indicate the position of driven arm 10. During such movements, the circular formation of the disk 16, except such times as the driving latching portion is in registry with the notch 25, will serve as a further means of holding the latching plate 22 in its manual latching position.

In order to disengage the manual operator 55 and reengage the power means, it is necessary to unlock the locking member 68 so as to free the arm 55 for its limited pivotal movement about the pivot 56. It is also necessary to bring the driving latch portion 24 in registry with the notch 25 in the disk 16. Provision is therefore made for driving the disk 16 to a predetermined position whenever the manual operator 55 is moved out of its normal stationary inactive position, and provided that the power means is in operative condition. This is accomplished by unbalancing the bridge 26 in a predetermined manner whenever the manual operator 55 is moved out of its normal inactive position. For this purpose, switch arms 75 and 76 respectively provided with contacts 77 and 78 are mounted upon the base plate 15. The switch arm 75 is fixed in position but the switch arm 76 is given an inherent bias or stress such that it tends to move its contact 78 away from the contact 77. However, when the manual operator 55 is in the inactive position shown, these switch blades are held in engagement with each other. This may be simply accomplished by providing the arm 55 with a piece of insulating material 79 which abuts the switch arm 76 and holds its contact 78 in engagement with the cooperating contact 77 whenever the arm 55 is in the inactive position. Upon the initial movement of arm 55 away from its inactive position, the insulating piece 79 will move away from the switch arm 76, whereupon such switch arm is free to move to switch opening position under the influence of its bias or internal stress.

Opening of this switch has the effect of placing infinite resistance in that leg of bridge 26 which contains the fixed resistance 32, such action is the same as if the temperature sensitive resistance increased greatly. As a result, the motor 13 will be operated to drive the disk 16 in valve closing direction. Therefore, if the electrical system is in operative condition when the manual operator is moved out of its inactive position, the bridge will be unbalanced in such a direction as to cause driving of the disk 16 in a clockwise direction to its extreme position wherein the stop portion 20 engages the stop pin 21.

With the disk 16 in this position, the notch 25 therein will be in registry with the driving latch portion 24 whenever the manual operator 55 is returned to its inactive position. It then remains only necessary to unlock the locking arm 68 in order to permit reengagement of latch plate 22 with disk 16. This unlocking function could be simply obtained by providing a pin 83 as shown in dotted lines mounted on the base plate 15, which pin would be engaged by the upper end of the locking arm 68 whenever the manual operator is placed in the inactive position as shown. Such an arrangement is satisfactory but has a possible disadvantage that the parts are unlocked every time the manual operator 55 is returned to its inactive position even though the power means is inoperative and has therefore not returned disk 16 to the extreme position. This can have no detrimental effect, however, since under such conditions the notch 25 would not be in registry with the driving latching portion 24 and upon the next subsequent movement of the manual operator 55 in a counter-clockwise direction the locking means would be relocked. However, I prefer in the absence of proper position of disk 16 to prevent this unlocking operation. To this end, I provide a pivoted unlocking arm 84 which is pivoted on the base plate 15 by a pin 85. This unlocking arm is normally biased to an inactive position against a pin 86 by means of a spring 87 having one end secured to the unlocking arm 84 and its other end secured to a pin 88 carried by the base plate 15. The unlocking arm 84 is provided with an extension 89 in the path of movement of a pin 90 carried by the disk 16. These parts are so proportioned that the pin 90 engages the extension 89 as the disk 16 moves into its extreme clockwise position with the result that when the disk 16 has reached such extreme position an extension 91 of the unlocking arm 84 engages an upstanding portion 92 carried by the right-hand end of the locking arm 68 and moves such arm to its unlocking position. In this manner, an unlocking action can only take place when two conditions occur. One of these conditions is that the disk 16 be driven to its extreme clockwise position. This is taken care of by opening the circuit to the left-hand end of balancing resistance 33 upon initial movement of the manual operator 55 out of its inactive position and provided of course that the electrical system is in operative condition. This could also be accomplished by unbalancing the bridge in the manner disclosed in the application of Russell H. Whempner heretofore referred to. The second of these matters is taken care of by returning the manual operating arm 55 to its inactive position. Under such conditions, the locking arm 68 is unlocked and the driving latching portion 24 is in registry with the notch 25 in the disk 16 so that these parts are recoupled by the camming action of surface 66 upon the last portion of the movement of manual operator 55 into its inactive position.

As heretofore explained, the latch plate 22 can never assume a position in which its latching portions 24 and 63 are both disengaged from their cooperating notches 25 and 64. In order to provide relatively quick movement of the latching plate 22 from its unlatching position to its other latching position and vice versa, and in order to tightly hold the latching plate 22 in either of its positions, I preferably provide an over-center spring 93 having one of its ends secured to a pin 94 carried by the latch plate 22, and its other end secured to a pin 95 carried by the plate 11. It has been pointed out how the circular surface of the disk 16 is an added means of maintaining the latching plate 22 in its manual latching position by cooperating with the portion 24 at all times except when the portion 24 is in registry with the notch 25. Similarly, the member 58 is provided with an arcuate extension 96 which cooperates with the end of the latching portion 63 to positively maintain the latching portion 24 in the notch 25 at all times except when the extension 63 is in registry with the notch 64. Although these functions are not absolutely necessary, they do provide extra safety features and further eliminate any possibility of the apparatus functioning improperly.

To briefly sum up the operation of my invention, with the parts in the positions shown the power means is connected to the driven arm 10 so that the driven arm 10 is automatically positioned in accordance with the temperature at the temperature sensitive resistance 28. Regardless of the position of the driven arm 10, the power means may be disconnected therefrom and the arm 10 positioned manually. This is accomplished through a single manual operator 55. Movement of the arm 55 causes counter-clockwise rotation of the complete assembly comprising arm 55, member 58 and plate 57. Then, depending upon the position of the driven arm 10 at that particular time, which also determines the position at which pin 30 will engage the edge 81 of plate 11, such counter-clockwise motion of this assembly will at some time during its movement cause the notch 64 to register with latching portion 63. Further movement of operator 55 causes it to pivot on plate 57 to unlatch the power means and simultaneously latch the manual operator 55 to the driven arm 10. It will therefore be evident that the unclutching and clutching actions are assured of taking place automatically, regardless of the position of the driven arm 10, upon moving the manual operator 55 from its inactive position to its extreme counterclockwise position. After this uncoupling of the power means and coupling of the manual operator has been accomplished, the arm 10 is then positionable as desired merely by manipulating the manual operator 55. Thereafter, the power means may not be reclutched until such power means is operative so as to be automatically driven to the extreme position described and until the manual operator is returned back to its inactive position.

It should further be noted that under no conditions can the driven arm 10 be uncoupled from both the power operator and the manual operator at the same time. Further, since the latch mechanism provides a positive two-way drive under all conditions, it makes no difference whether or not the driven arm 10 is subject to an unbalanced load or the direction of such unbalanced load.

The power operating means of course need not be electrical. Further, the particular manner in which the power means is controlled is immaterial in so far as the broader aspects of my invention are concerned. Many changes and modifications will occur to those skilled in the art and I therefore intend to be limited only by the scope of the appended claims.

I claim as my invention:

1. In a positioning system, in combination, a member to be positioned, a power operator therefor, a manual operator therefor, coupling means having first and second positions for selectively coupling said operators to said member arranged to prevent disconnection of said member from both of said operators at the same time under all conditions of operation whereby one or the other of said operators is always connected to said member, said coupling means being operable to cause positioning of said member upon movement of one of said operators, and means to snap said coupling means between its first and second positions.

2. In combination, a member to be positioned, a power driven element, a manual operator, coupling means normally coupling said member to the power driven element but operable to couple said member to the manual operator, means operated by said manual operator for actuating said coupling means to uncouple the power means from said member and couple the manual operator thereto, latch means operable as an incident to said uncoupling and coupling actions to latch said coupling means in the condition wherein said member is coupled to said manual operator, and means operable as an incident to movement of said manual operator to a predetermined position to unlatch said latch means.

3. In combination, a member to be positioned, a power driven element, a manual operator, coupling means normally coupling said member to the power driven element but operable to couple said member to the manual operator, means operated by said manual operator for actuating said coupling means to uncouple the power means from said member and couple the manual operator thereto, latch means operable as an incident to said uncoupling and coupling actions to latch said coupling means in the condition wherein said member is coupled to said manual operator, means operable as an incident to movement of said manual operator in a manner to uncouple said power means for positioning said power means in a predetermined position, and means operable upon movement of said manual operator to a predetermined position when said power means is in its predetermined position for unlatching said latch means.

4. In combination, a power driven shaft, a driven element connected thereto, a member to be positioned journalled concentrically with the shaft, a manual element also journalled concentrically with said shaft, coupling means carried by said member and selectively movable to engage said driven element or said manual element, and means operable by said manual element upon movement thereof to operate said coupling means, the contour of one of said elements being such as to normally hold said coupling means in engagement with the other of said elements.

5. In combination, a member to be positioned, power means normally coupled to said member for operating the same, manual means for operating said member having a normal inactive position, means operable upon movement of said manual means out of said inactive position to uncouple said power means from said member and to couple said manual means thereto, means to lock said coupling means to maintain said manual means coupled to said member, and means operable upon movement of said manual means back to its inactive position to unlock said locking means.

6. In combination, a member to be positioned, power means normally coupled to said member for operating the same, manual means for operating said member having a normal inactive position, means operable upon movement of said manual means out of said inactive position to uncouple said power means from said member and to couple said manual means thereto, means to lock said coupling means to maintain said manual means coupled to said member, and means to recouple said power means to said member including means to unlock said locking means.

7. In combination, a member to be positioned, power means normally coupled to said member for operating the same, manual means for operating said member having a normal inactive position, means operable upon movement of said manual means out of said inactive position to uncouple said power means from said member and to couple said manual means thereto, means to lock said coupling means to maintain said manual means coupled to said member, and means to recouple said power means to said member including means to unlock said locking means as an incident to movement of said manual means back to its inactive position.

8. In combination, a member to be positioned, power means normally coupled to said member for operating the same, manual means for operating said member having a normal inactive position, means operable upon movement of said manual means out of said inactive position to uncouple said power means from said member and to couple said manual means thereto, means to lock said coupling means to maintain said manual means coupled to said member, means operable upon movement of said manual means out of its inactive position to move said power means to a predetermined position, and means operative when said power means is in said predetermined position to unlock said locking means and recouple said power means to said element upon movement of said manual means to its inactive position.

9. In combination, a member to be positioned, a power driven element for positioning said member, a manual element for positioning said member, and means having first and second positions for selectively coupling one or the other of said elements to said member, said elements having contours cooperating with said coupling means to positively maintain said coupling means in said first or second position after being moved thereto.

10. In combination, a device to be positioned in a plurality of positions and movable throughout a limited range of movement, power means for positioning said device in said plurality of positions, manual means for also positioning said device in said plurality of positions, coupling means selectively operable to couple either said power means or said manual means to said device, and means operable as an incident to movement of said manual means to a position corresponding to the then position of said device in its limited range of movement for operating said coupling means to uncouple said device from said power means and couple it to said manual means whereby the position of said manual means will thereafter indicate the position of said device in its range of movement.

11. In combination, a member to be positioned, a power driven member, a manual operating member, selective coupling means carried by said member to be positioned which when moved in a first direction couples said member to be positioned to said manual member and when moved in a second opposite direction couples said member to be positioned to said power driven member, one or the other of said power driven and manual members always being coupled to said driven member, and means operable as an incident to movement of said manual operating member for operating said coupling means in said first direction to couple said manual member to said member to be positioned, said coupling means maintaining the connection between said manual member and said member to be positioned upon initial reverse movement of said manual member whereby upon reverse movement of said manual member the member to be positioned immediately follows such reverse movement of the manual member.

WALTER E. EDELMAN.